May 8, 1956 V. E. McCOY 2,744,798
LUBRICATING DEVICE
Filed Nov. 25, 1952 6 Sheets-Sheet 1
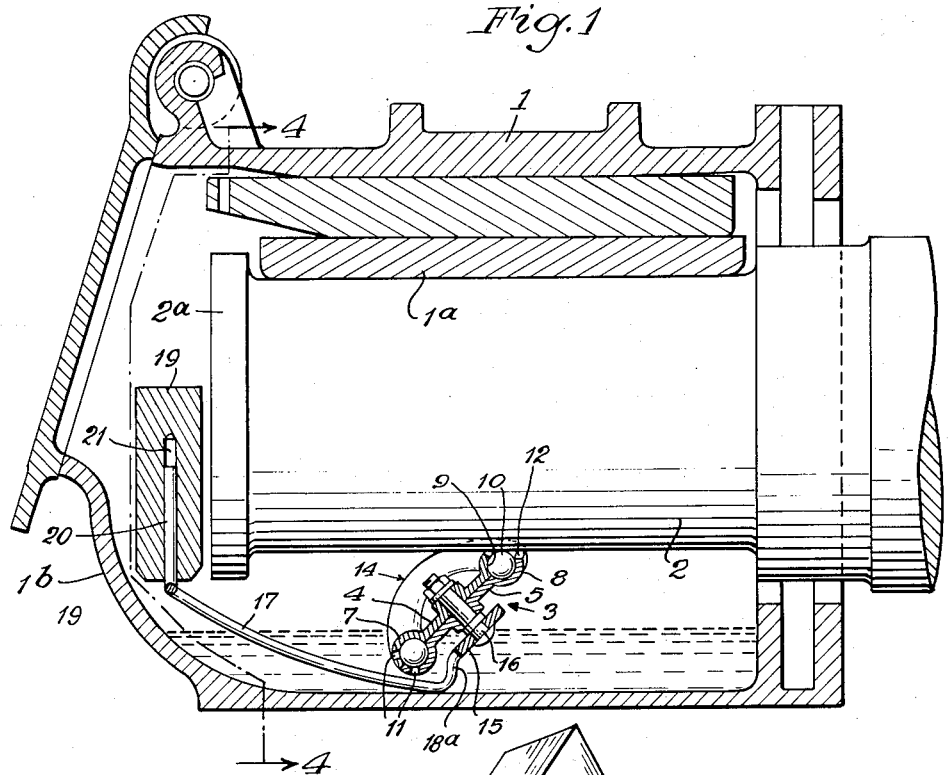
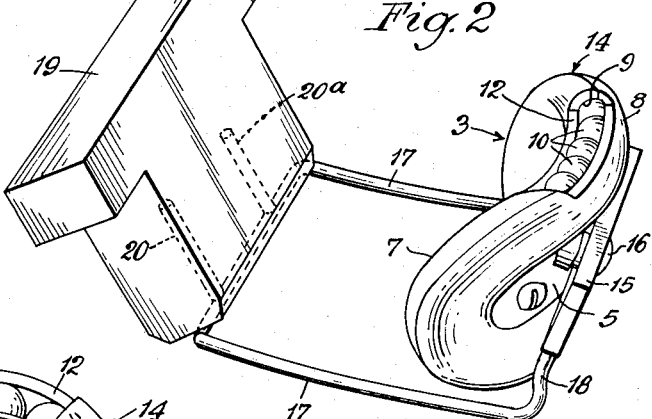
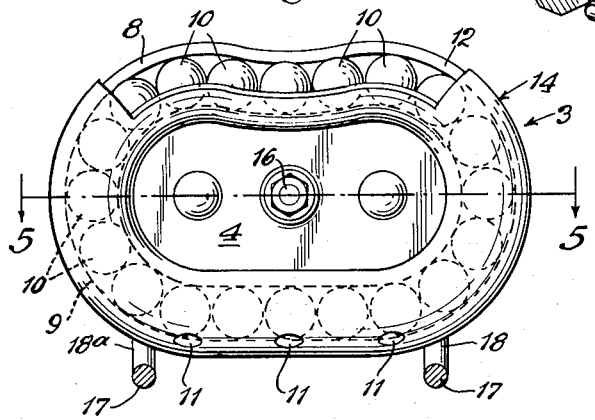
Inventor
Verl E. McCoy
by Parker Carter
Attorneys May 8, 1956 V. E. McCOY 2,744,798
LUBRICATING DEVICE
Filed Nov. 25, 1952 6 Sheets-Sheet 2

Inventor
Verl E. McCoy
by Parker Carter
Attorneys

May 8, 1956  V. E. McCOY  2,744,798
LUBRICATING DEVICE
Filed Nov. 25, 1952  6 Sheets-Sheet 3
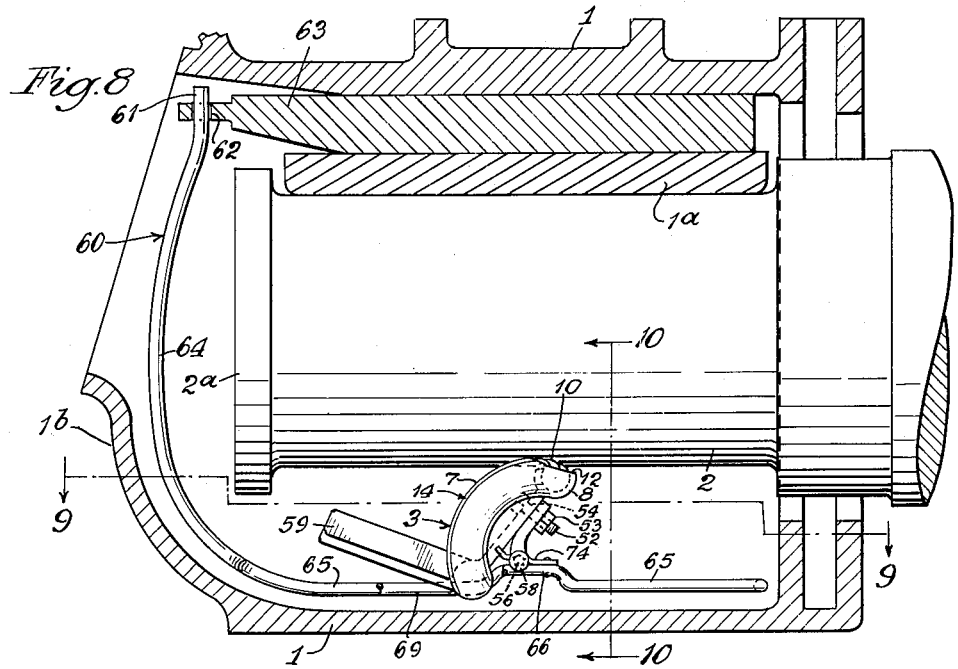
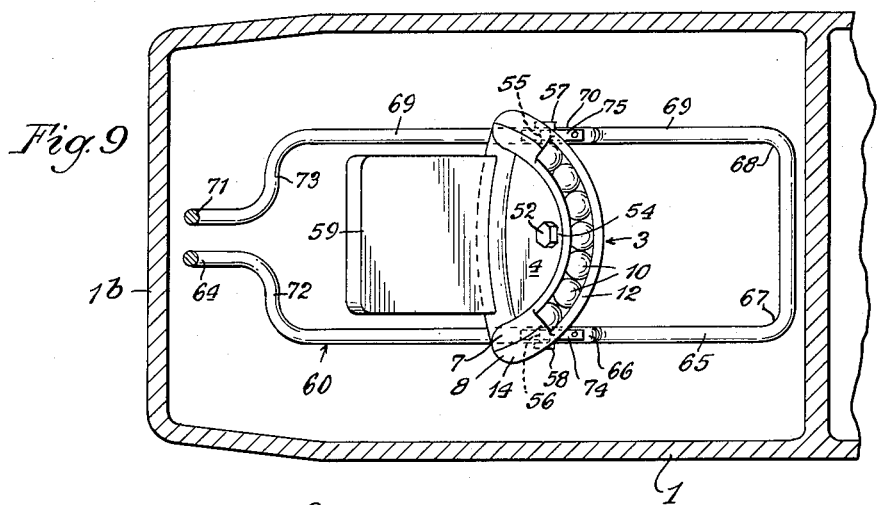
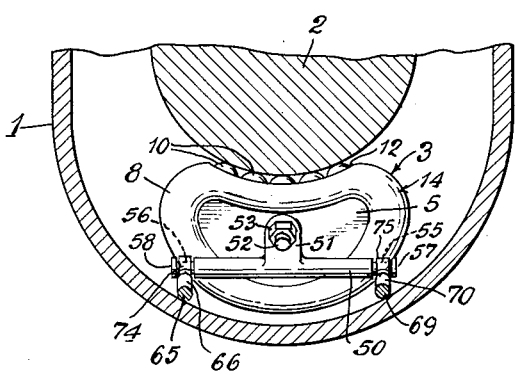
Inventor
Verl E. McCoy
by Parker Carter
Attorneys May 8, 1956 V. E. McCOY 2,744,798
LUBRICATING DEVICE
Filed Nov. 25, 1952 6 Sheets-Sheet 4
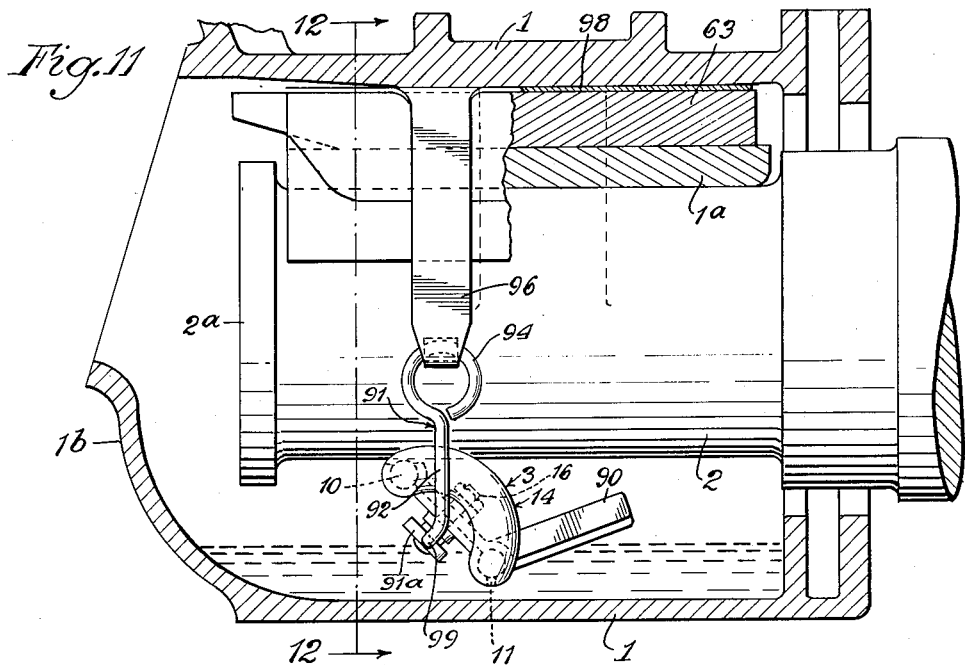
Inventor
Verl E. McCoy
by Parker Carter
Attorneys May 8, 1956  V. E. McCOY  2,744,798
LUBRICATING DEVICE
Filed Nov. 25, 1952  6 Sheets-Sheet 5
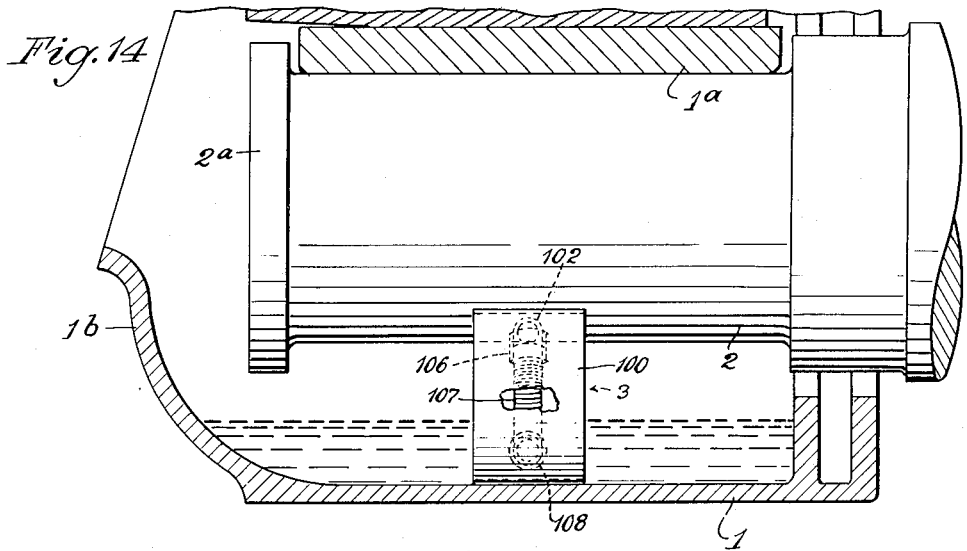
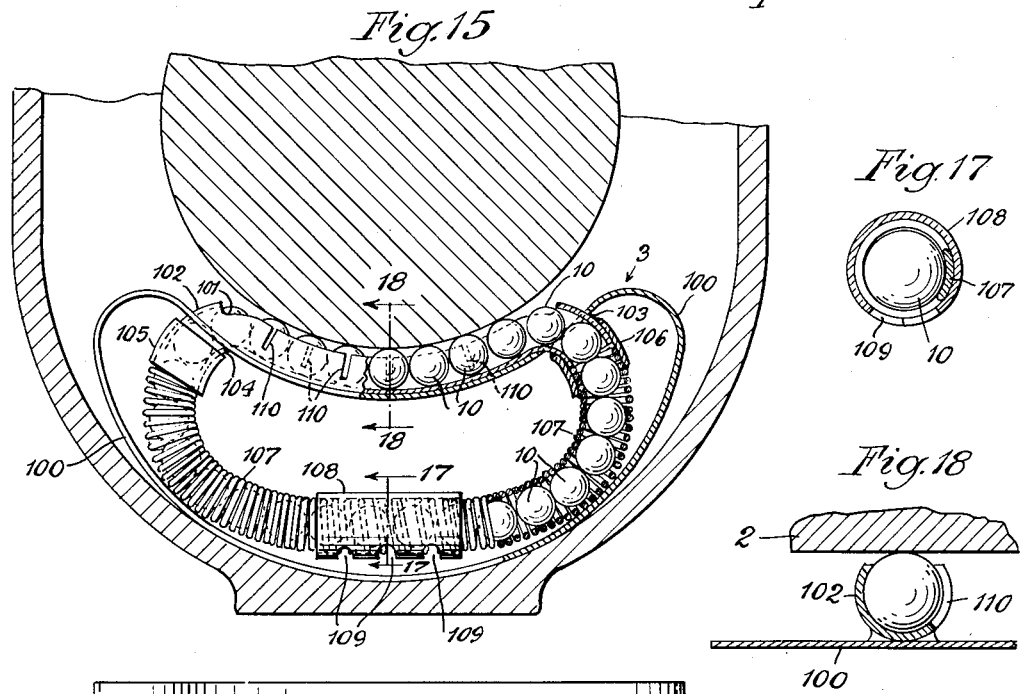
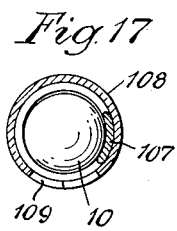
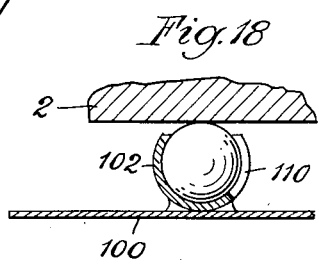
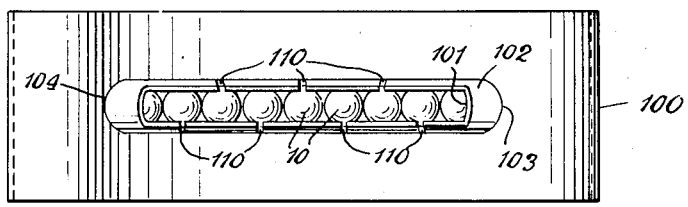
Inventor
Verl E. McCoy
by Parker & Carter
Attorneys

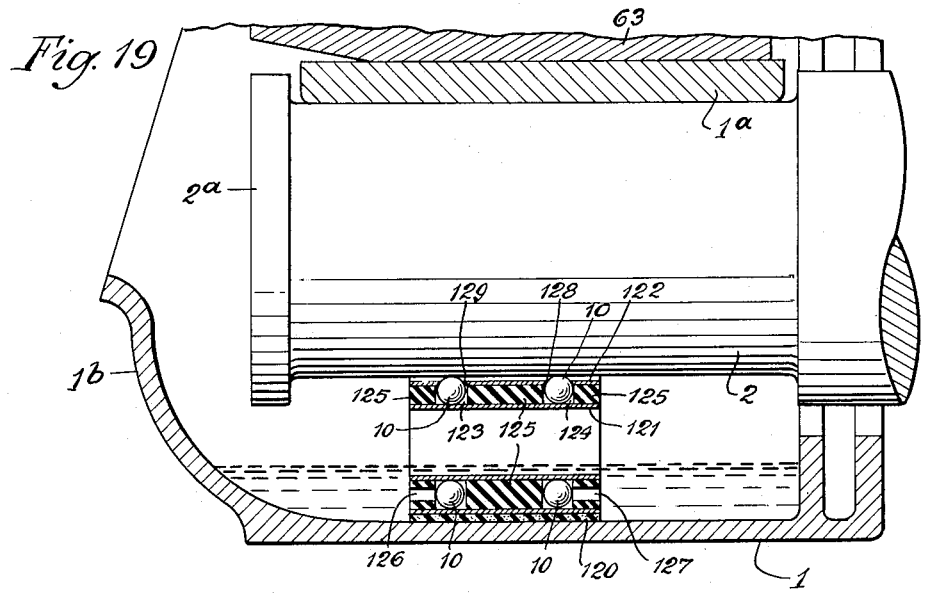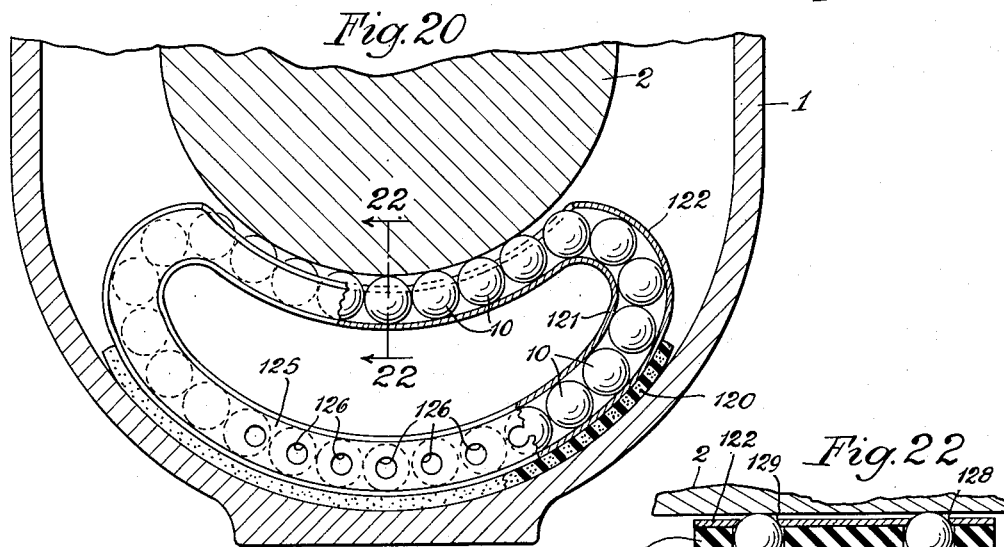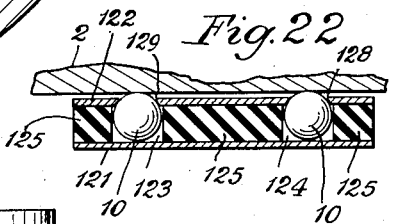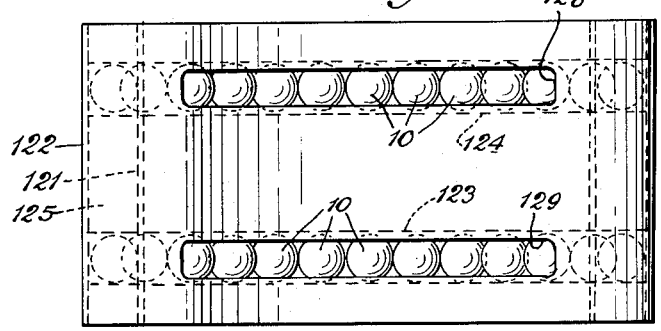

United States Patent Office 2,744,798
Patented May 8, 1956

2,744,798

LUBRICATING DEVICE

Verl E. McCoy, La Grange, Ill.

Application November 25, 1952, Serial No. 322,503

14 Claims. (Cl. 308—91)

My invention relates to lubricating devices and particularly to lubricating devices for axles of railroad cars and the like and has for one purpose the provision of a lubricating device which may be easily and quickly removed and installed.

Another purpose is to provide a lubricating device which will be effective to apply the required amount of lubricant to an axle as the rotational speed of such axle increases and decreases.

Another purpose is to provide a lubricating device which may be installed in the journal boxes of railway cars without the modification in any way of such journal boxes.

Another purpose is to provide a lubricating device which may be easily and economically manufactured and which is light in weight.

Another purpose is to provide a lubricating device having a minimum of parts and capable of withstanding a great deal of wear and tear before requiring replacement.

Other purposes will appear from time to time throughout the specification and claims.

My invention is illustrated more or less diagrammatically in the accompanying drawings, wherein:

Figure 1 is a side view, in partial cross-section, of the device installed in one manner in a railroad junction box;

Figure 2 is a perspective view of the device and one form of support means on a scale enlarged over that of Figure 1;

Figure 3 is an end view of the lubricating device taken from a position to the left of Figure 1;

Figure 8 is a side view of the device in combination with another alternate support means;

Figure 9 is a view taken on the line 9—9 of Figure 8;

Figure 10 is a view taken on the line 10—10 of Figure 8;

Figure 11 is a side view of the device in combination with another alternate support means;

Figure 12 is a view taken on the line 12—12 of Figure 11;

Figure 13 is a perspective view of a portion of the support means shown in Figures 11 and 12;

Figure 14 is a side view of the device in combination with another alternate support means;

Figure 15 is a cross-sectional end view of the device and support means shown in Figure 14;

Figure 16 is a top view of the device and support means shown in Figure 14;

Figure 17 is a view taken on the line 17—17 of Figure 15;

Figure 18 is a view taken on the line 18—18 of Figure 15;

Figure 19 is a side view in cross-section of an alternate form of the device in combination with an alternate form of support means;

Figure 20 is an end view in partial cross-section of the device and support means shown in Figure 19;

Figure 21 is a top view of the device and support means shown in Figure 19;

Figure 22 is a view taken on the line 22—22 of Figure 20;

Like parts are indicated by like characters throughout the specification and drawings.

Figure 4:
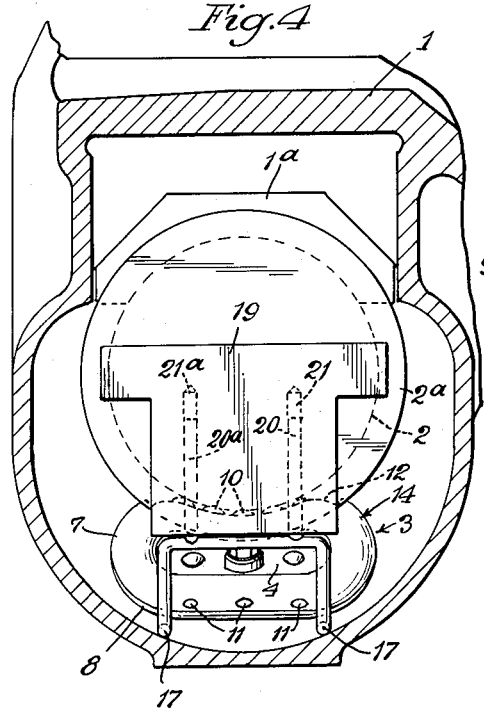
Figure 4 is a view taken on the line 4—4 of Figure 1.
Figure 5:
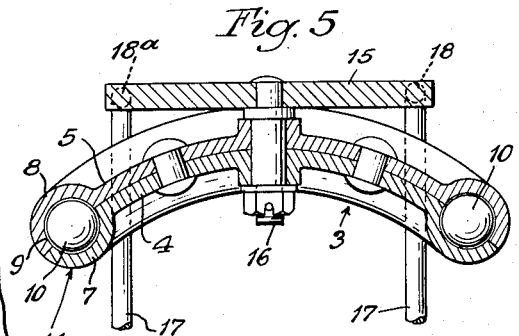
Figure 5 is a view taken on the line 5—5 of Figure 3.

Referring now to the structure illustrated in the accompanying drawings:

Indicated generally at 1 is a journal box of a railway car. It will be understood that my lubricating device may be utilized in a variety of structures in which a rotating member, such as an axle, must be lubricated. For purposes of illustration, however, the structure is shown as applied in the lubrication of axles of railway cars.

2 indicates an axle to be lubricated disposed within the journal box. Beneath the axle 2 is the lubricating device 3. It will be realized that the device may be installed in a variety of ways. In whatever manner the lubricating device is installed, it will be understood that one portion of the device is held in pressure contact with the axle; the axle being supported in no way by the lubricating device itself.

Indicated at 1–a is an axle bearing which, in the case of the railway car journal box illustrated, is held, as by a wedge, between the axle and the top wall of the box. It will be understood that the bearing, or bearing plate 1–a, bears downwardly upon substantially the entire portion of the axle within the journal box 1.

The lubricating device 3 is comprised of a housing 14 which is formed of two half-shell members 4 and 5, each of which has a peripheral trough 7 and 8, which, when the two half-shell members are placed together, are in registration with each other to form the peripheral race 9. It will be seen that the housing 14 could be formed in one piece by casting, forging or machining, the formation in two pieces being a preferred manner of construction.

Disposed within the race 9 is a plurality of balls 10. Adjacent the lower portion, considering the device in the position which it assumes, when installed, of the lubricating device is the aperture or apertures 11. A portion of an outer edge of the device and the race 9 is cut away as at 12 to an extent sufficient to permit a portion of each of the balls 10 to extend therethrough as each ball traverses the cut-away portion. This cut-away portion is of insufficient size and depth, however, to permit the escape of the balls 10 from the race 9 or the housing 14.

While I show the movable and rotatable lubricant-applying members in the drawings herein as a preferred embodiment, it will be understood that other members, say rollers, may be suitably mounted for rotation and movement in a similar housing. Similarly, while I show the preferred and more efficient peripheral internal closed channel in which the balls 10 are enclosed with an opening 12 and apertures 11, it will be seen that the opening 12 could in a particular installation be co-extensive with the channel or race 9.

While the device may be installed in a variety of ways, I illustrate a simple and effective installation and one which is particularly efficient in railway car journal boxes and the like.

It will be realized that the device may be formed in a generally concave-convex kidney-shaped configuration, with the ends generally wider across than the mid-portion in order to present the largest number of ball-bearing surfaces to the axle and that this is the preferred, though not the exclusive, embodiment of the invention. The device is installed in a vertically inclined plane beneath the axle, as shown in Figure 1. The kidney-shaped configuration further provides a securing action preventing substantial movement of the device transversely of the axle.

Many mechanisms, such as the railway truck axle and boxcar journal-box, are subject to fluctuation, vibration and shifting of the relative position of parts to be lubricated. Thus, the lubricating device must be yieldingly held in pressure contact with the axle or item to be lubricated, and, if continuous lubrication is to be achieved, the device must be so held throughout such shifting and vibration.

A mounting plate 15 is fixed to the back or concave outer face of the housing 14 at a point adjacent the center thereof, as by bolt-and-nut connection 16. A support 17, which may be formed of heavy wire, having a raised end portion, or portions 18—18a, attached to the plate 15, is adapted to lie along the floor of an axle housing such as the journal box 1. It will be seen that the support 17 lies beneath the device 3 and extends outwardly away from the face of the device opposite the face to which the mounting plate 15 is attached.

In order to insure a pressure contact of the device 3 against the axle 2 a teeter-totter effect is employed. A positioning weight or securing member 19, which may be dimensioned to fit within a journal box between the end of a railway truck axle and the outermost wall 1b of the box, is detachably connected to the support 17, as by the upstanding wire post members 20—20a and the apertures 21—21a set in the weight 19 to a depth sufficient to admit substantially the entire length of the posts 20—20a. The support 17 may be formed in a generally arcuate configuration with the low point, when the support is horizontal, of the arc located between the device 3 and the posts 20—20a; or the support 17 may lie in a generally flat plane and a raised portion in the floor of the axle housing, say a journal box, may be used as a fulcrum. In either event, the member 19 which may be varied in weight, presses downwardly on one end of the support 17, causing its opposite end to which the device 3 is attached, to rise, thus bringing the device 3 in yielding pressure contact of varying intensity with the axle 2.

The device 3 may be pivotally mounted with the pivot point located closer to the opening 12 than it is to the opposite edge of the device. Thus the additional weight of the larger portion of the device housing and the larger number of balls being located below the point of pivot cause that portion of the device to swing downwardly. It is only necessary then to mount the device with the point at which it is pivoted closer to the item to be lubricated than the distance between such point of pivot and the outer lip of the opening 12. Thus the device will lie in an inclined plane, the heavier portion being immersed in the lubricant, the lighter portion being yieldingly held, by the weight of the heavier portion, against the item to be lubricated.

As illustrated in Figure 1, the positioning weight 19 rides between the end 2a of the axle 2 and the wall 1b of the journal box 1. Thus the lubricating device is held against lateral movement along the axle 2 and while the entire lubricating assembly is free to vibrate and fluctuate with the movement and vibration of the axle and journal box, still the device will easily maintain its general position. This result is achieved even though no part of the assembly is connected or fixedly secured in any way to the journal box, or its parts, or to the axle.

Figure 6:
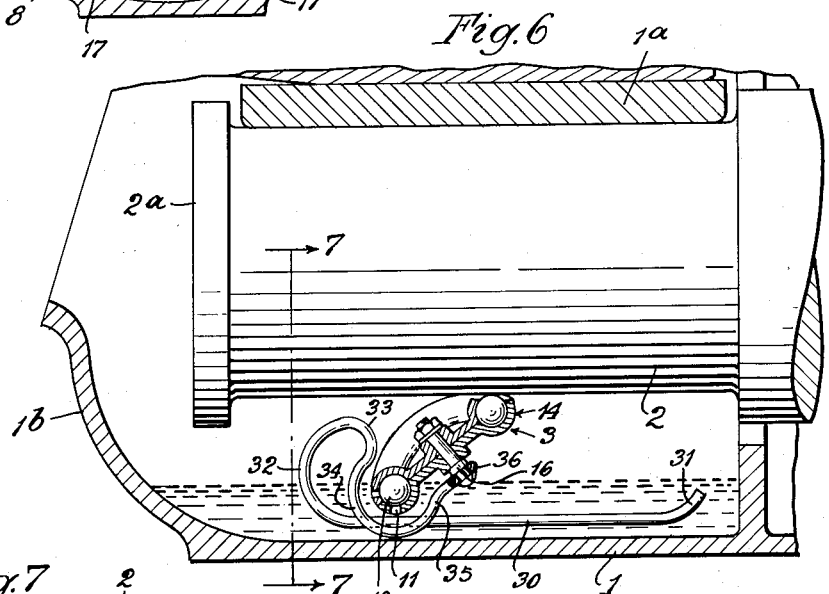
Figure 6 is a side view in partial cross-section of the device in combination with an alternate form of support means.
Figure 7:
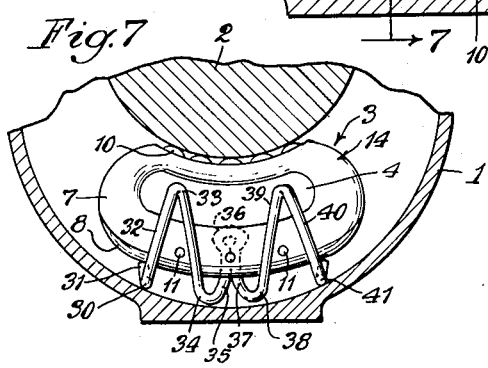
Figure 7 is a view taken on the line 7—7 of Figure 6.

Illustrated in Figures 6 and 7 is an alternate form of support means. 30 illustrates an elongated wire adapted to lie parallel with the floor of a railroad junction box or the like. The member 30 has an upwardly bent end portion 31 to permit ease of entry into the journal box. The wire member 30 is bent upwardly and backwardly upon itself as at 32 at its end opposite from the bent end portion 31. The member 30 is thereafter bent alternately downwardly back upon itself, downwardly in the opposite direction, and again, upwardly back upon itself as at 33, 34 and 35. It will be noted that the bend 34 extends below the elongated portion of the member 30. The wire member 30 then continues in an upwardly inclined portion 36, which is bent upon itself to form a circular opening through which the device 3 may be attached to the support in the manner illustrated and described with relation to Figures 1, 2 and 3. The member 30 continues then in the bends 37, 38, 39 and 40 and in the elongated portion 41, which correspond to the bends 35, 34, 33, 32 and the elongated portion described above. It will be seen that the elongated portions are disposed in general alignment vertically with the outer ends of the device 3, and the bent portions above described, are disposed between the elongated portions which are adapted to lie along the sides of the bottom of the journal box.

In Figures 8, 9 and 10, I illustrate an alternate supporting means for the lubricating device 3. 50 is a trunnion member having the upward projection 51 centrally located thereon. The projection 51 is apertured to permit the attachment of the device 3 with any suitable attaching means which may be the bolt 52 and the nut 53. The device 3 is apertured centrally thereof and near the top of the device to permit the bolt 52 to extend therethrough, as at 54. The trunnion member 50 has reduced portions 55 and 56 adjacent its ends and the enlarged portions 57, 58 at its ends beyond the reduced portions. The device 3 has the weight member 59 attached to the bottom portion of the housing 14 as by welding or any suitable means. The weight member 59 is a substantially rectangular member and extends from the housing 14 at an angle with the general plane of the housing.

A wire member 60 is bent upon itself in a particular manner to form a support for the structure above described. An end portion 61 is inserted through an aperture 62 in a portion of the journal box structure adjacent the top thereof, which may be the wedge member 63 which normally forms a component of railroad journal boxes. From the end portions 61 the wire member 60 extends downwardly in a slightly curved path across the front of the journal box and is bent at substantially right angles thereto, thereafter extending in a plane substantially parallel to the bottom portion of the journal box. The downwardly extending portion is numbered 64. The rearwardly extending portion, numbered 65, has a centrally raised portion 66. The rearwardly extending portion 65, beyond the raised section 66, is bent at right angles as at 67 and 68 and thereafter extends forwardly along the bottom portion of the journal box parallel to the portion 65, the forwardly extending portion being numbered 69. It will be realized that the portion 69 contains the raised portion 70 which is equal to and in alignment with the raised portion 66 in the portion 65. The portion 69 continues in an upwardly extending curved portion 71, which terminates in an end portion similar to and in alignment with the end portion 61. The portions 64 and 71 may be bent outwardly away from each other as at 72—73 in order to spread the portions 65 and 69 to permit the device 3 to rest therebetween.

The raised portions 66—70 carry the wire clip members 74—75, which have their open ends directed forwardly toward the front of the journal box. It will be seen that the reduced portions 55, 56 of the trunnion member 50 are disposed to be forced between the clip members 74—75 and the raised section 66—69, in order to pivotally mount the device on the member 60.

While the trunnion member 50 is described as having reduced portions 55—56, it will be realized that the trunnion member 50 could be formed as the sleeve and the reduced portions 55—56 could be formed as a bolt disposed within the sleeve.

In Figures 11, 12 and 13, I illustrate another alternate form of support means for the device 3, which, as in previous forms, has the substantially central aperture and attaching means, but having the weight member 90 attached to the bottom of the housing and extending at an angle therefrom as in the manner illustrated in Figures 8–10. The lubricating device 3 is mounted on a wire hook member 91 as at 91a. The wire member 91 has upwardly extending hook members 92—93, which are bent upon themselves to form the eyes 94—95. The eyes are adapted to be penetrated by the suspension members 96—97, which extend downwardly from opposite side edges of the plate 98, which is disposed between the wedge 63 and the ceiling wall of a railroad journal box as illustrated in Figures 11 and 12. It will be noted that the side hook members 92—93 and the suspension arms 96—97 are so proportioned as to cause the transverse portion 99 of the wire hook member 91 to lie in a plane which is remote from the axle 2 for a distance which is less than the distance between the mounting 91a of the device 3 and the top portion or opening 12 in the housing 14 of the device 3.

In Figures 14–18, I illustrate another alternate form of device and supporting means. 100 is a leaf spring member substantially wider than the balls which are utilized in my lubricating device. The spring 100 is formed in a continuous concave-convex support following generally the lines of the lubricating device 3, with the exception that the spring support 100 extends further at its ends than the device 3 and is somewhat more convex at its bottom portion than the device 3. It will be noted that this bottom portion thus follows generally the curved bottom portion of a railroad journal box as illustrated in Figure 15. It will be observed also that the upwardly extending end portions of the spring support 100 are disposed above the lowest portion of the axle 2.

For use with the support means 100 I form the housing 14 for my lubricating device 3 in a somewhat different manner from that illustrated in Figures 1–13. The upper portion of the housing for the balls 10 is formed in a manner similar to that of Figures 1–13 except that an opening 101 is formed generally across the top rather than along one side of the upper portion of the ball housing. It will be noted also that the housing for the balls 10 is not concave-convex in two planes but is substantially vertical as illustrated in Figure 14 and is concave-convex in one plane only as illustrated in Figure 15. The upper portion 102 of the housing for the balls 10 lies generally along the upper concave portion of the spring support 100 and extends therethrough adjacent the upwardly extending end portions of the support 100 as at 103, 104. The upper housing 102 has its ends terminating just inside the frame formed by the support 100, these end portions being surrounded by coupling members 105—106. The remainder of the housing for the balls 10 is formed of a spring 107 which is generally convex and which is of the same diameter as the housing upper member 102 and is connected thereto by the couplings 105—106. 108 illustrates a spreader adapted to surround the bottom central portion of the spring 107 and to hold the coils of the spring 107 generally separated to permit the entrance of oil through the coils of the spring. The spreader 108 is apertured as at 109 to permit the entrance of the oil to the spring coils and thus to the balls 10.

The upper housing member 102, which is substantially hollow and may be made of metal, has its side walls apertured as at 110, the apertures 110 being substantially thin slots disposed transversely of the member 102. In some installations, a bubbling of oil may be experienced as the balls move through the race and transfer their oil to the axle 2. The apertures 110 permit a breathing of this oil and prevent the bubbling around the area at which the oil application step takes place.

In Figures 19–22, I illustrate another variant form of supporting means for my lubricating device 3 and a variant form of a housing in the lubricating device.

120 indicates a pad formed of resilient flexible material such as synthetic rubber or the like. The pad 120 may or may not be employed with this form of my device but I find it advantageous to employ it. The pad 120 lies along the curved floor of a railroad journal box and the lubricating device rests thereon. It will be observed, as shown in Figure 19, that the pad 120 is coextensive in width with the lubricating device. In this form of my device, I provide a generally concave-convex housing formed of two continuous leaf spring members 121, 122, one arranged inside the other, which may be formed of spring steel. The two springs being of substantially identical shape, the spring 121 being smaller than the spring 122 to a degree sufficient to provide a space between the two springs through which the balls 10 may move. I illustrate two parallel ball races 123 and 124, which are substantially vertical and which follow the concave-convex path created by the leaf springs 121, 122. The space between the springs 121, 122 between the ball races 123, 124, and between the ball race 123 and one edge of the leaf springs 121, 122, and between the race 124 and the opposite edge of the leaf springs 121, 122 is filled with a resilient flexible material 125, which may be synthetic rubber or the like. This last named resilient flexible material adjacent the edges of the leaf springs 121, 122 is apertured as at 126 and 127, said apertures or channels being of sufficient length to permit the oil in the bottom of the railroad journal box to contact the balls 10 in the races 123, 124.

The leaf spring 122 has its upper concave portion apertured as at 128, 129 to permit a portion of the balls 10 to extend therethrough as they traverse the portion of the race in alignment with the apertures 128, 129 as is illustrated best in Figure 22. It will be observed that the upper portion of the leaf spring 122 which carries the apertures 128, 129 is pressed inwardly closer to the inner leaf spring 121 than the remainder of the leaf spring 122 in order to permit the balls to extend outwardly from the races 123, 124.

It will be realized that whereas I have described and claimed a practical and operative device, nevertheless, many changes may be made in size, shape, number and disposition of the parts without departing from the spirit of my invention, I wish my description and drawings to be taken as in a broad sense illustrative or diagrammatic rather than as limiting me to the specific showing herein.

The use and operation of my invention are as follows:

The device 3 is placed in position by bringing the cut-away portion 12 of the housing 14 in alignment with and adjacent to the member to be lubricated, which, in the case illustrated, is the axle 2. The device is brought close enough to the axle to permit the balls 10 to be in pressure contact with such axle. This is easily accomplished in the embodiment and employment illustrated, since it is necessary only to open the end door of the journal box, insert the device 3 and the support 17, which easily fit through the door, and then set the weight 19 on the posts 20—20a. The portion of the lubricating device having the apertures 11 is disposed and immersed within the oil or lubricant. As the axle rotates, the balls 10 are caused to rotate and to move through the race or track 9. As the balls pass the apertures 11, they are coated with the lubricant 13. As the balls 10 thereafter make contact with the axle 2, the lubricant thus acquired is applied to the axle. The lubricant is carried through rotation of the axle, upwardly and under the bearing 1–a, the pressure contact of the bearing against the axle and the lateral shifting of the axle relative to the bearing causing the lubricant to spread laterally over substantially the entire portion of the axle within the journal box. As rotational speed of the axle increases, the individual rotational speed and the speed of the balls 10 through the race 9, likewise increase and a greater amount of oil is applied to the axle.

The individual rotational speed of the balls 10 and their speed through the race 9 may be varied, even though the rotational speed of the axle remains constant, by a change in the intensity of the yielding pressure contact between the portion of the balls 10 extending through the opening 12 and the axle 2. In the case of the mounting shown in Fig. 1, this pressure can be varied by varying the weight of the member 19, while in the variant forms of the support, an arm or catch may be installed to hold the lower portion of the housing 14 down to the point at which it will force the balls 10 against the axle 2 with the desired pressure, or these portions may simply be made heavier or lighter as desired. In any event, the speed of the balls, rotational and through the race, may be set at greater or less than the rotational speed of the axle, thus applying a greater or less amount of oil per axle revolution, by varying the pressure of the balls 10 against the axle. Likewise, the speeds of the balls 10 may be synchronized with that of the axle, by selection of the proper pressure. Since in any case, an increase or decrease in axle speed produces a corresponding increase or decrease in the speeds of the balls 10, the speed ratio initially established is maintained and the proper predetermined amount of oil per unit of measure will be applied constantly. If a change in amount of lubrication is desired, it is only necessary to change the pressure of the balls 10 against the axle 2.

While I indicate the use of one device 3, and while one unit is sufficient to lubricate a wide expanse such as the axle 2, it will be realized that a plurality of devices 3 could be installed where desired, and in this regard, I provide a device so easily and economically manufactured as to make their multiple use feasible.

The device may be quickly and easily manually removed and replaced without removal or modification of journal boxes and the like, because of its simple, light weight construction and small size and because of the ease and simplicity of installation described.

In order to install the device in combination with the support means illustrated in Figures 6 and 7, it is necessary only to extend the end portion illustrated by the numeral 31 through the opening in the journal box and downwardly under the axle 2. The device 3 and the upper curved portions of the wire member 30 may be flattened out by manual pressure in order to permit them to bypass the enlarged portion of the axle 2. When the device has reached the operating position illustrated in Figure 6, it is only necessary to release manual pressure and the pressure tension of the wire member will cause the device to assume the position illustrated in Figure 6. Thus yielding pressure is maintained between the balls 10, as they bypass the aperture 12 in the housing 14, and the axle 2.

To install the device in combination with the support means illustrated in Figures 8–10, it is necessary only to insert the support member 60, spread the arms 64–71, and to thereafter slide the device 3 which carries the weight 59 between the enlarged end portion of the axle 2 and the journal box and to thereafter slip the reduced portions 55, 56 into the wire clip member 74, 75. As the operator releases the device 3 after inserting the pinion member 50 into the clip 74, 75, the weight 59 will cause the device to pivot in a counterclockwise direction and thus to bring the balls 10 into yielding pressure contact with the axle 2 as illustrated in Figures 8 and 10.

To install the device in combination with the support illustrated in Figures 11–13, it is necessary first merely to slip the plate 98 between the wedge 63 and the upper wall of the journal box as illustrated in Figures 11 and 12, insuring that the downwardly depending suspension hook members 16—17 are disposed along either side of the axle 2. Thereafter, the wire hook member 91 which carries the device 3 may be slipped between the enlarged end portion of the axle 2 and the journal box wall into position generally below the suspension arms 96—97. The device 3 and the weight 90 may be held in a more or less horizontal position while the eyes 94—95 are placed over the hooks in the arms 96, 97 and when the operator releases the device 3, the weight 90 will cause the device to pivot in a clockwise direction thus bringing the balls 10 into yielding pressure in the axle 2.

It will be realized that the device 3 with the attached weight 90 could be installed in a position reversed to that shown in Figure 11 and the suspension arms could be moved further to the right in such structure, in which case the device would rotate in a counterclockwise direction when released by the operator after installation to bring the balls into contact with the axle.

Since the support means illustrated in Figures 8–13 are in continuous contact with the wedge lying above the axle, any vibration or motion of the axle is participated in by the support and device and relative motion therebetween is minimized.

In Figures 14–18, I illustrate another form of my lubricating device and support means therefor. Since the support means consists essentially in a spring steel frame, and since the housing for the balls 10 is made primarily of a coiled spring, it will be seen that it is a simple matter for the operator to manually compress the device, pressing the upper concave portion downwardly toward the lower convex portion and thereafter to slide the device between the enlarged end portion of the axle 2 and the housing wall into the position shown in Figure 14. It will be seen that the steel spring frame 100 and the housing 102 carry upper rounded end portions which, when the operator releases the device, will spring into positions above the lowermost portion of the axle 2, thus preventing substantial motion of the device transversely of the axle. While the device remains free to move longitudinally of the axle due to vibration, this is not, in some installations, considered detrimental.

The combination of my device and support means illustrated in Figures 19–22 is installed in a manner similar to that in which the structure, illustrated in Figures 14–18, is installed. The resilient flexible pad 120 may be placed on the floor of the lubricant-containing structure, such as a railroad journal box, and the device be manually compressed and slipped between the axle and the journal box into position between the pad and the axle and thereafter released by the operator. The resilient nature of the frames 122—121 and of the filler material 125 will cause the device to spring back into the shape illustrated in Figure 20 and thus to bring the balls into contact with the axle 2. While the device may be installed without the use of the pad 120, it will be seen that the pad provides an additional resiliency to the structure and also creates a friction means to inhibit longitudinal movement of the device within the journal box. While I illustrate two races, it will be realized that one or more races may be employed.

I claim:

1. In a lubricating device, a housing, a track, generally rounded members mounted for rotation in and for movement along said track, and openings in said housing in communication with the areas in said housing in which said rounded members are mounted, and a support for said device comprising a base having a generally upstanding portion and a connection between said upstanding portion and said device.

2. The structure of claim 1 wherein the connection between said upstanding portion and said device is a pivotal connection.

3. In a lubricating system for railroad car journal boxes, wherein a railroad truck axle extends within said box, said box being substantially larger in cross-section than said axle, a housing adapted to fit within said journal box between a wall of said journal box and said axle, a race of generally rounded members rotatably and movably mounted in said housing, a peripheral opening in said housing through which extends a portion of said rounded members, a supply of lubricant in said journal box and in contact with said housing, an aperture in said housing at the point of contact of said lubricant and in communication with said race, a support connected to said housing and positioned to maintain a portion of said rounded members which extends through said opening in pressure contact with said axle as said rounded members are forced to traverse said opening by rotation of the axle against said rounded members.

4. In a lubricating device and support therefor, a housing having a generally circuitous, generally peripheral track, generally rounded members movably and rotatably mounted in said track, said track having sidewalls, at least one of said sidewalls having a cutaway portion, the remaining portion of said last named sidewall being of a height less than the diameter of said rounded members and adapted, in co-operation with the remaining sidewalls, to grip said members, a weight secured adjacent an edge of said housing opposite one of said openings, the plane of said weight intersecting the plane of said housing at an angle, a support for said housing, including a crossmember, a pivotal connection between said crossmember and said housing and means for suspending said crossmember from a point above said crossmember.

5. In a lubricating device, a housing, generally rounded members movably and rotatably mounted in said housing, and openings in said housing in communication with the areas in said housing in which said rounded members are mounted, and a weight member connected to said housing adjacent an edge portion thereof, the plane occupied by said weight intersecting the plane occupied by said housing at an angle.

6. In a lubricating device, a housing, generally rounded members movably and rotatably mounted in said housing, said housing comprising a generally convex coiled spring having a diameter therethrough and a generally concave tubular member connected to and having an inside diameter substantially equal to that of the spring, said tubular member having openings in the walls thereof in communication with an area in said housing in which said rounded members are mounted, and a support for said housing including a compressible metal frame formed generally in the shape of said housing and having portions in engagement with said housing.

7. A lubricating device comprising an outer frame and a smaller inner frame, the walls of said inner frame being generally parallel with the walls of said outer frame, said frames together forming a generally concave-convex housing open at its ends, a plurality of rounded members movably and rotatably mounted within the space between said frames, the upper concave portion of the outer frame having a generally rectangular slot therethrough, said upper convex portion being depressed inwardly toward the upper convex portion of said inner frame sufficient to expose a portion of said rounded members through said slot, said slot being less in width than said rounded members, a resilient flexible material arranged in the space between said frames to fill substantially all of the space between said frames except for an annular race in registration with said slot and of sufficient width to permit the passage of said rounded members, and a channel in said resilient flexible material in communication with said race adjacent the bottom convex portion of said frames adapted to bring said race in communication with the area outside said frames.

8. The structure of claim 7 characterized by and including a supporting pad of flexible resilient material adapted to underlie said outer frame.

9. The structure of claim 7 characterized by and including a plurality of races within said flexible material and slots in said outer frame in registration with said races.

10. A lubricating device comprising a housing, a generally peripheral internal channel in said housing, a plurality of generally rounded members rotatably and movably mounted in said channel, a generally longitudinal opening in said housing in communication with a portion of said channel through which a portion of each rounded member is permitted to extend as it traverses said channel portion and an aperture in said housing in communication with said channel and slots in the walls of said housing adjacent said opening and in communication with said channel.

11. In a lubricating device, a housing, generally rounded members movably and rotatably mounted in said housing, and openings in said housing in communication with the areas in said housing in which said rounded members are mounted, at least one of said openings being located on one side of the center of said housing and at least another of said openings being located on the opposite side of the center of said housing, said housing being formed of a coiled spring having an inside diameter sufficient to permit the passage of said rounded members therethrough in combination with tubular members having an inside diameter substantially equal to that of the spring and having said openings therein.

12. In a lubricating device, a housing, generally rounded members movably and rotatably mounted in said housing, and openings in said housing in communication with the areas in said housing in which said rounded members are mounted, at least one of said openings being located on one side of the center of said housing and at least another of said openings being located on the opposite side of the center of said housing and a support connected to said lubricating device, said support comprising a base, a generally upstanding portion adjacent one end of said base and adapted to support said lubricating device, a generally upstanding portion at another portion of said base and a securing member removably connected to said last named upstanding portion.

13. The structure of claim 12 wherein said base is of generally arcuate form having its low point between said upstanding portions.

14. A lubricant transfer device comprising a housing, said housing being concave-convex in lateral cross-section and concave-convex in longitudinal cross-section, a peripheral internal cylindrical continuous track in said housing, a plurality of balls movably and rotatably mounted in said track, a linear opening in the peripheral wall of said housing in communication with said track, said opening having a lateral dimension less than the diameter of said balls whereby a portion of said balls is permitted to extend outwardly through said opening as said balls traverse that part of the track with which said opening is in communication and whereby said balls are prevented from escape from said track, and apertures in the peripheral wall of said housing opposite said opening and in communication with said track whereby lubricant may enter said track through said apertures to contact said balls.

References Cited in the file of this patent

UNITED STATES PATENTS

| | | |
|---|---|---|
| 522,838 | Knauer | July 10, 1894 |
| 690,483 | Thomas | Jan. 7, 1902 |
| 713,183 | Wands | Nov. 11, 1902 |
| 864,778 | Gamage | Sept. 3, 1907 |
| 1,185,114 | McIlwain | May 30, 1916 |
| 2,280,659 | Muller | Apr. 21, 1942 |
| 2,451,359 | Schlicksupp | Oct. 12, 1948 |

FOREIGN PATENTS

| | | |
|---|---|---|
| 335,953 | Germany | Apr. 26, 1921 |
| 488,310 | Germany | July 7, 1928 |